United States Patent [19]

Torrani

[11] 4,361,747
[45] Nov. 30, 1982

[54] MANUAL TORCHES FOR TIG WELDING

[76] Inventor: Roberto Torrani, Le Noyer-Fontanivent, CH-1817, Brent, Italy

[21] Appl. No.: 264,255

[22] Filed: May 18, 1981

Related U.S. Application Data

[63] Continuation of Ser. No. 57,141, Jul. 12, 1979, abandoned.

[30] Foreign Application Priority Data

Jul. 25, 1978 [CH] Switzerland .......................... 8015/78

[51] Int. Cl.³ .............................................. B23K 9/32
[52] U.S. Cl. ....................................... 219/75; 219/136
[58] Field of Search .................................. 219/75, 136

[56] References Cited

U.S. PATENT DOCUMENTS

| 2,547,872 | 4/1951 | Kissick | 219/75 |
| 2,743,346 | 4/1956 | Scholl | 219/75 |
| 2,797,301 | 6/1957 | Copeles et al | 219/75 |
| 2,986,624 | 5/1961 | Marta | 219/75 |
| 4,145,595 | 3/1979 | Keller et al. | 219/75 |

Primary Examiner—Elliot A. Goldberg
Attorney, Agent, or Firm—Pollock, Vande Sande & Priddy

[57] ABSTRACT

A manual torch for TIG welding comprising an insulating handle, one head provided with an insulating casing supporting an orientable tungsten electrode surrounded by a ceramic nozzle, and further comprising supply and exhaust means for a refrigerating fluid, and means for supplying a flow of protective gas.

2 Claims, 4 Drawing Figures

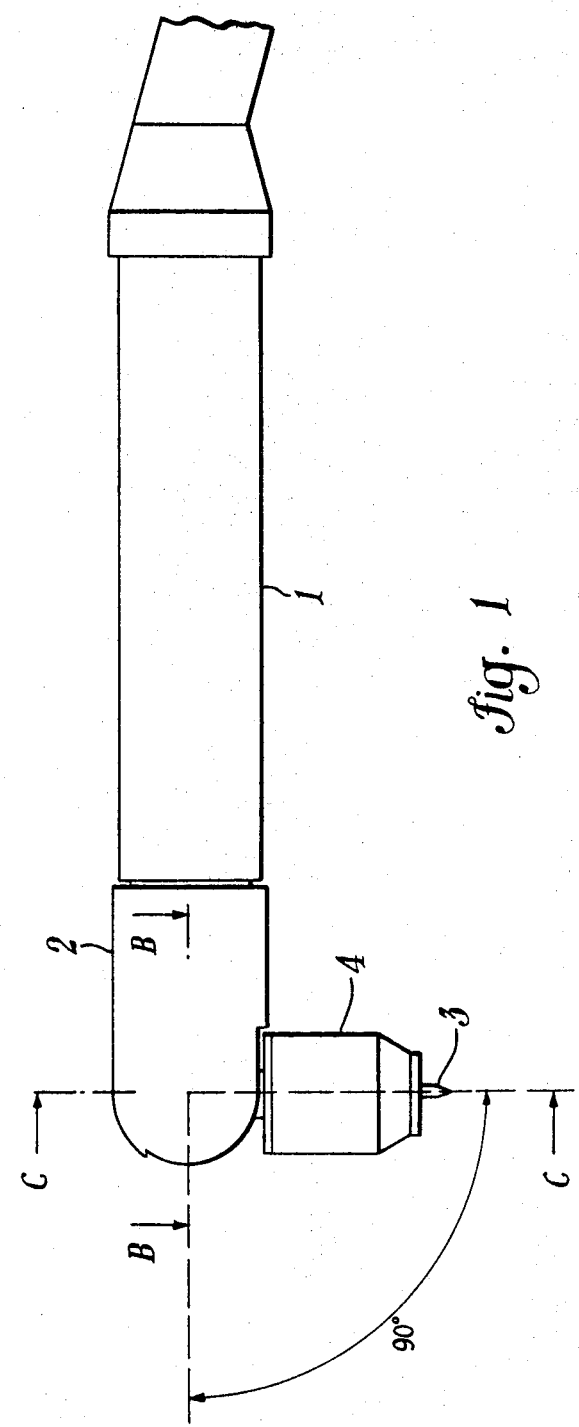

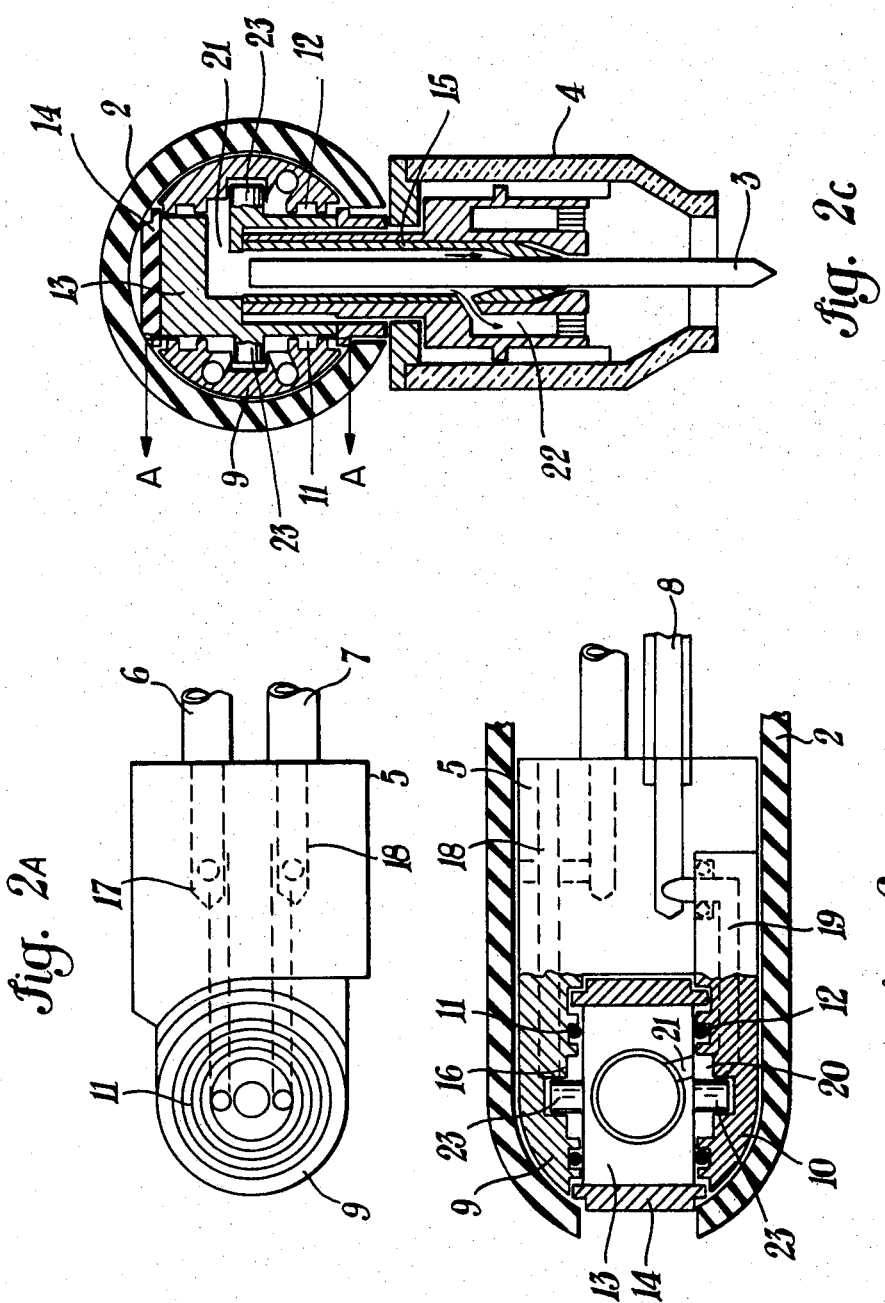

MANUAL TORCHES FOR TIG WELDING

This application is a continuation of application Ser. No. 57,141, filed July 12, 1979, now abandoned.

The present invention relates to an improvement in manual torches for TIG arc welding with inclinable electrode and water cooling up to the electrode carrier.

TIG (tungsten inert gas) welding processes are known where the melting of the material for the weld is obtained by an electric arc formed between the material itself and a tungsten electrode, under a flow of inert gas for protection against oxidation of the material itself.

The priming of the electric arc between the tungsten and the material to be welded is effected by a high frequency electric discharge which, causing the ionization of the surrounding gas, allows the subsequent passage of high intensity and low voltage current for the actual welding.

In view of the high power operating during the welding and thus of the amount of developed heat, particular attention must be given to the cooling of the tungsten electrode carrier and to the insulation of whole electrode carrier body with respect to the piece being welded, also at the high frequencies, in order to avoid spurious discharges.

The position of the electrode, i.e., the inclination of the tungsten point with respect to the welding bath, has a great influence on the regularity of the welding and must change according to the shape of the piece, the position and the available space, sometimes reduced, about the piece to be welded.

For these reasons torches having different configurations (inclimation of the electrode) are required for a single welding.

It is an object of the present invention to provide a manual torch for welding wherein the electrode can be inclined at will to adapt it to various working conditions.

The invention will now be described with reference to a preferred embodiment thereof, disclosed by way of non limitative example and with reference to the attached drawings, wherein:

FIG. 1 is a side view of the welding torch according to the present invention, in the position of maximum inclination of the electrode carrier unit; and FIGS. 2A and 2C are sectional views taken along the lines A—A, B—B and C—C of FIG. 1.

With reference to the drawings, the torch according to the invention consists of an insulating handle 1, of a head provided with an insulating casing 2 and of an orientable tungsten electrode 3 surrounded by a ceramic nozzle 4.

The structure of the welding head is shown in greater details in FIGS. 2A, 2B and 2C.

The welding head includes a cylindrical body 5 to the rear part of which are welded the pipes 6 and 7 for the refrigerating fluid and the pipe 8 for supplying the protective inert gas.

The forward part of the head consists of two flanks 9 and 10, the first flank being fixed and the second being movable.

The flanks are recessed so that each receives a seal ring denoted by 11 and 12, respectively.

Between the two flanks a rotatable block 13 is located, surrounded by an insulating ring 14 and having the electrode carrier 15 fixed therein. The insulating ring is so shaped as to entirely surround all metal parts so as to prevent leakage of the high frequency current for priming the arc.

The refrigerating fluid supplied by the pipes 6 and 7 is carried to the central recess 16 of the flank 9 through the holes 17 and 18. Within the recess 16 the fluid directly flows on the rotatable block 13, cooling 17.

The protective gas is carried through the duct 19 to the recess 20 of the removable flank wherefrom through conduit 21 it is supplied into the ceramic nozzle 4 protecting the electrode, through a calm recess 22.

The rotatable block 13 is pivoted on the flanks by means of two pivot pins 23 so embodied as to assure a good electric conductivity. Also, the surface of the block 13 whereon the refrigerating fluid flows is so made as to assure the maximum heat exchange between the block and the fluid so as to prevent overheating of the block.

Having thus described the present invention, what is claimed is:

1. A manual torch for TIG welding, comprising, in combination
   (a) an insulating handle;
   (b) a head fastened to one end of said handle and provided with an insulating casing, said head having a forward portion comprising a first, stationary flank and a second, removable flank, and a rear portion to which cooling fluid conduit means and inert gas conduit means are attached;
   (c) a rotatable block arranged between said first and second flanks and having a recess for the flow of the inert protective gas connected to said inert gas conduit means;
   (d) an orientable carrier bearing an electrode and supported by said block, said carrier having a circular recess provided around said electrode and connected to said recess of said rotatable block;
   (e) a ceramic nozzle surrounding said electrode;
   (f) a pivot pin provided on each side of said rotatable block to rotatably support it on said stationary and removable flank, respectively, to allow both the rotation of said rotatable block to a desired inclination angle of said electrode and supply of the electric current thereto; and
   (g) an insulating ring partially surrounding said rotatable block to allow its rotation within the maximum inclination range and to avoid dispersion of high frequency arc ignition currents.

2. A manual torch for TIG welding as claimed in claim 1, wherein said stationary flank has a central recess to which cooling fluid is supplied from said cooling fluid conduit means for directly cooling said rotatable block within said recess, said cooling fluid being supplied entirely within said head and said handle.

* * * * *